Figure 5:
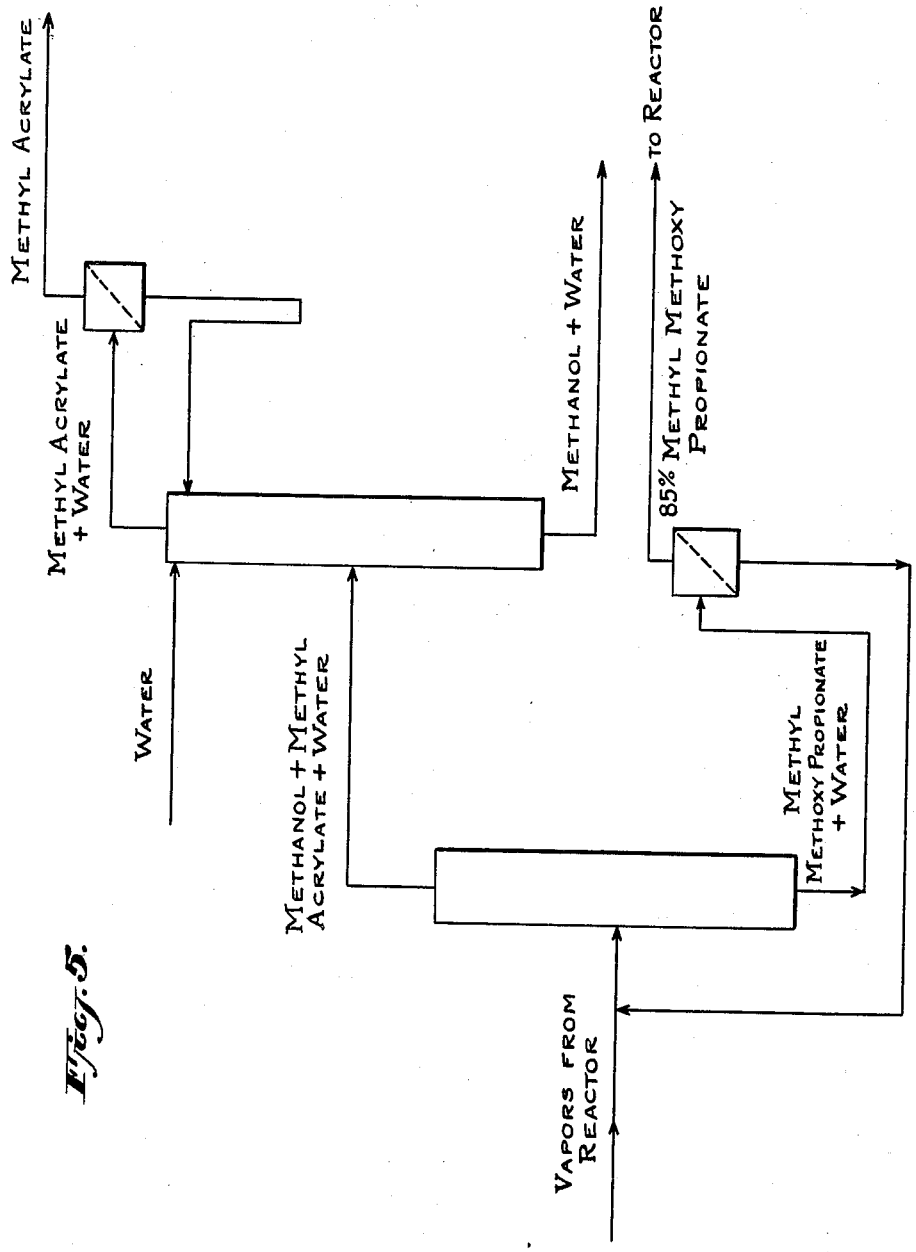

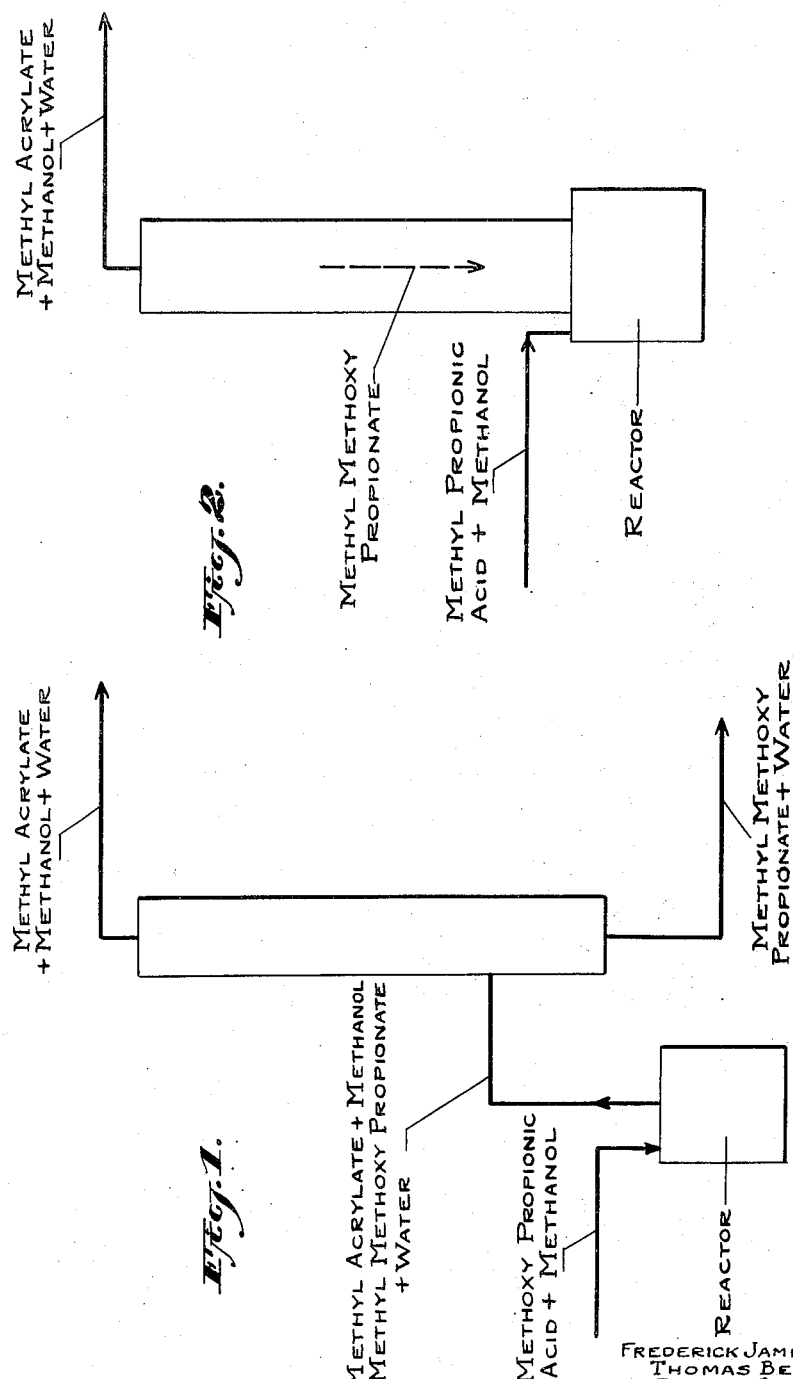

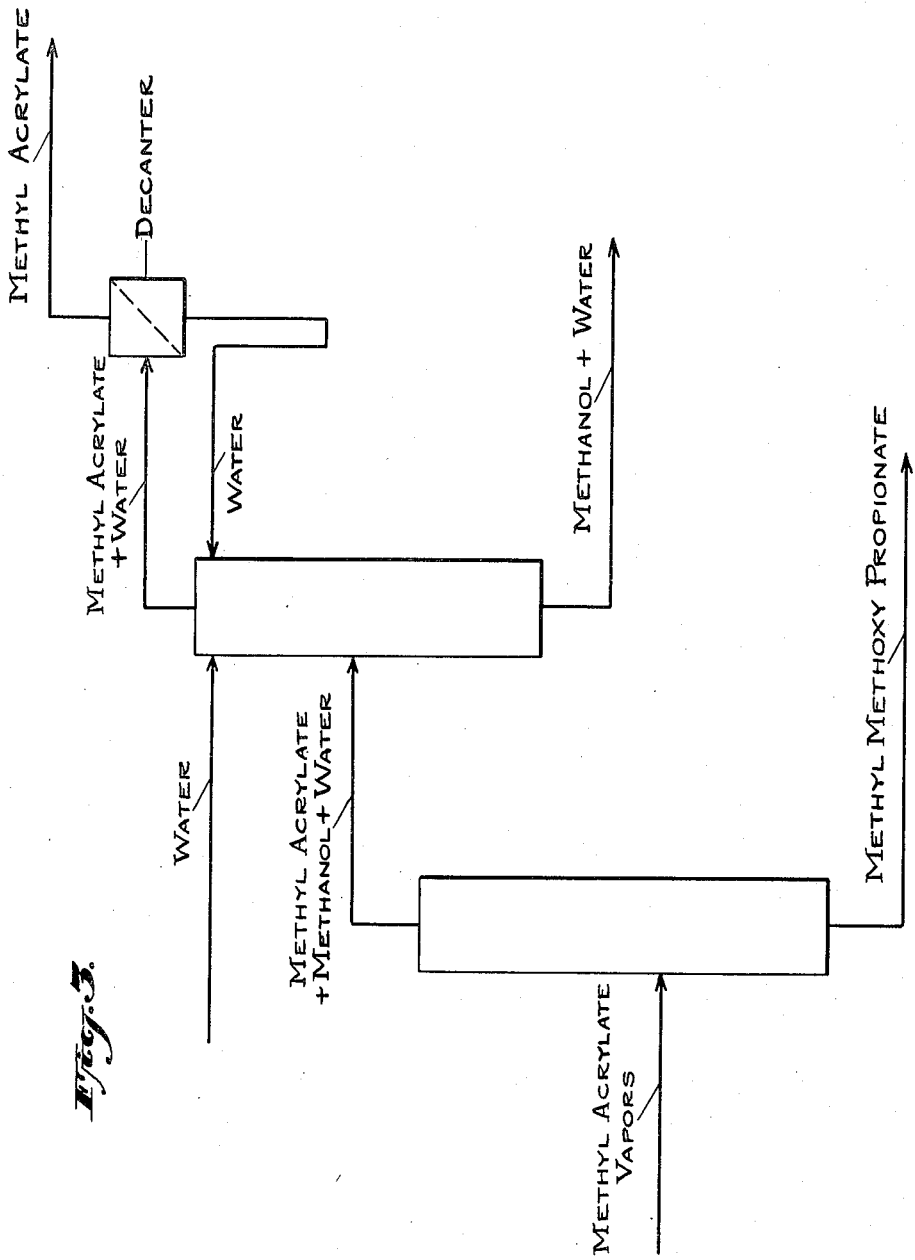

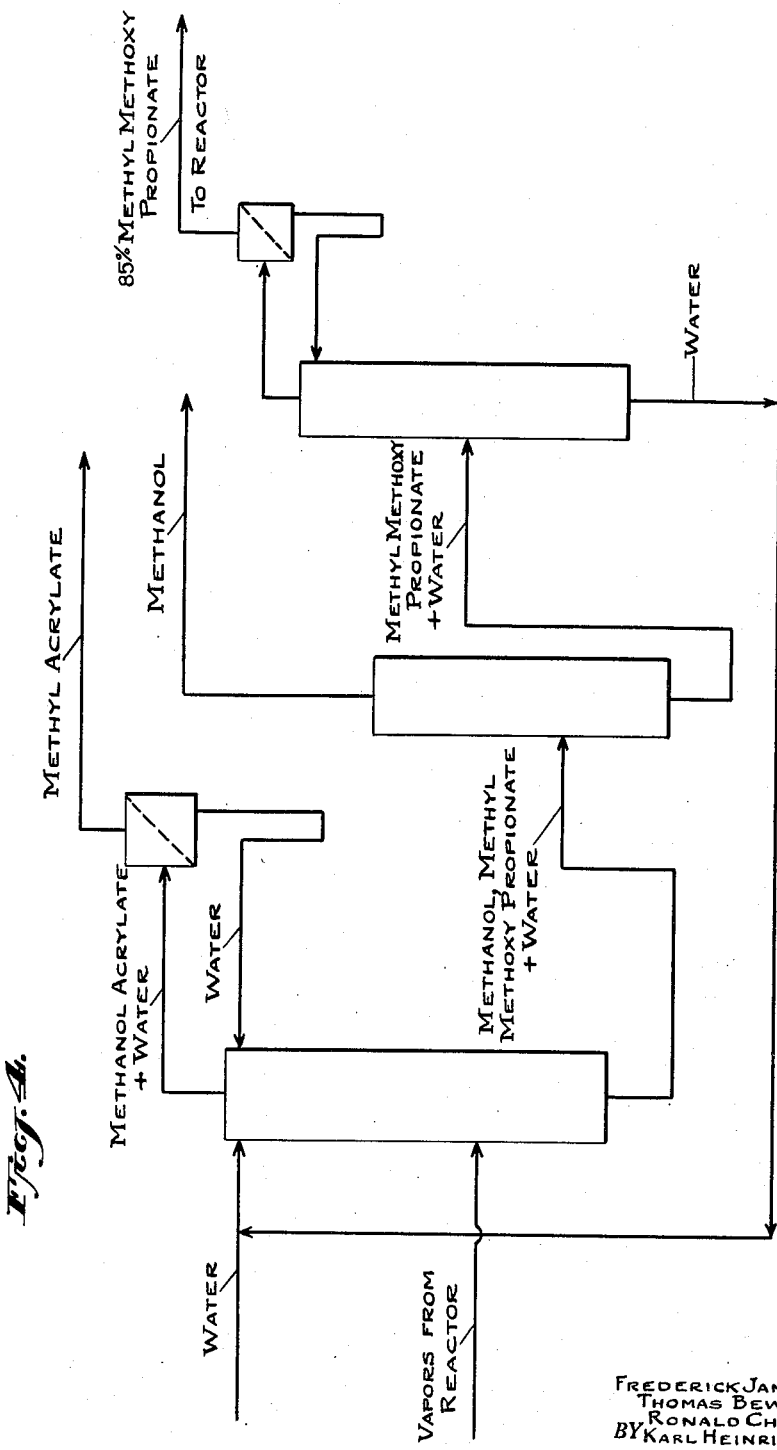

Aug. 18, 1953   F. J. BELLRINGER ET AL   2,649,475
PROCESS FOR THE MANUFACTURE OF METHYL ACRYLATE
Filed June 12, 1951                          5 Sheets-Sheet 4

INVENTORS.
FREDERICK JAMES BELLRINGER,
THOMAS BEWLEY
RONALD CHARLES SNELL.
KARL HEINRICH WALTER TURCK.
BY
their ATTORNEYS.

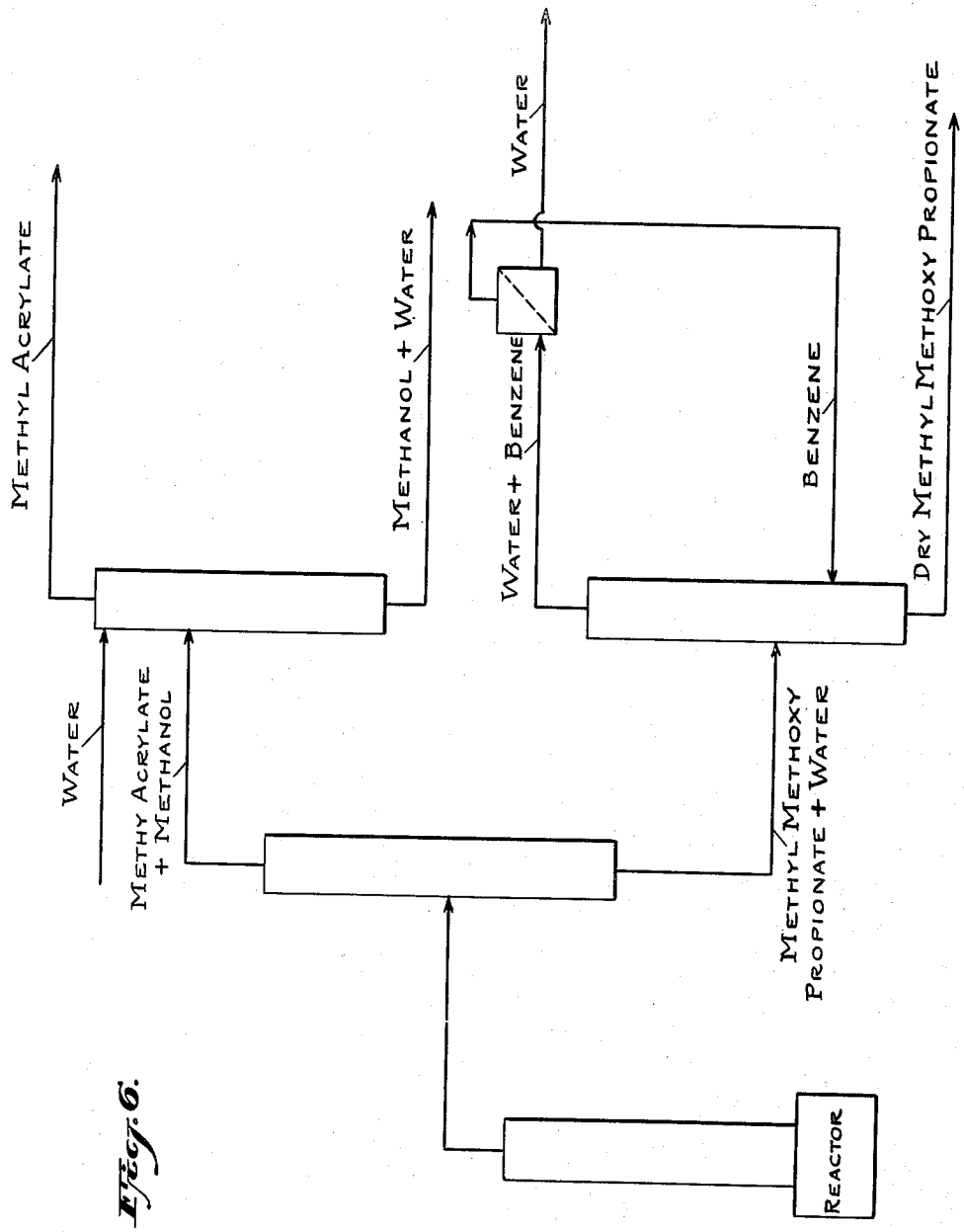

Patented Aug. 18, 1953

2,649,475

UNITED STATES PATENT OFFICE 2,649,475

PROCESS FOR THE MANUFACTURE OF METHYL ACRYLATE

Frederick James Bellringer, Wimbledon, London, Thomas Bewley, Epsom, Ronald Charles Snell, Hull, and Karl Heinrich Walter Turck, Banstead, England, assignors to The Distillers Company Limited, Edinburgh, Scotland, a British company Application June 12, 1951, Serial No. 231,134
In Great Britain June 14, 1950

23 Claims. (Cl. 260—486)

The present invention relates to the manufacture of methyl acrylate and refers in particular to its manufacture in a continuous manner.

In U. S. Patent 2,464,768 there is disclosed a process wherein use is made of hydracrylic acid as starting material for the preparation of acrylic acid esters; the acid is introduced, together with alcohol amounting to as much as 3 to 4 times the quantity required by theory for the esterification, into a heated concentrated acid such as phosphoric acid or sulphuric acid and the process effected in such a way that this acid forms a major part of the reaction mixture. Although the alcohol is stated to be used in a large excess the resulting reaction product distilling over is said still to contain free acrylic acid. According to this disclosure the spent catalyst is continuously withdrawn and replaced by fresh mineral acid introduced with the hydracrylic acid and alcohol. The patentees state that in the case of methyl acrylate a yield of about 62% based on the hydracrylic acid employed was obtained.

It has further been suggested to produce methyl acrylate from methoxy propionic acid by de-alcoholisation on heating in the presence of acidic catalysts. When the reaction is effected in a distillation vessel the acrylic acid distills off as it is formed. It has also been suggested to carry out the reaction under reflux and to work up the reaction product obtained by distillation. In this case the methanol molecule which is split off esterifies to a limited extent the free carboxy group especially when the duration of the treatment is prolonged during the refluxing. As acidic catalyst for effecting the conversion concentrated sulphuric acid in comparatively large quantities has been used but this acid was in the course of time diluted by the water liberated through the esterification. In addition, various quantities of water were added in the course of the process. It will be seen from this that the suggested process can only be effected batchwise and that the addition of water with the consequent increasing dilution of the acid will prevent the latter from being reused for further charges. Furthermore the high concentration of acid in the reaction mixture causes a considerable amount of charring so that the impure and dilute acid would require costly purification and reconcentration by distillation after each batch before re-use. Moreover, the methanol liberated from the methoxy propionic acid had been found not to be sufficient to esterify completely the acrylic acid produced because methanol forms an azeotropic mixture with methyl acrylate so that some methanol is removed from the reaction mixture. To counteract this deficiency it has been suggested to carry out the decomposition of the methoxy propionic acid in the presence of an excess of methanol. In spite of this excess of methanol, part of the free acrylic acid escaped esterification and was found in the condensate of the distillate.

It is necessary to separate the free acrylic acid in the distillate from the ester and water and convert it by a special process to the corresponding ester. Unfortunately, the acid tends to polymerise more readily than the acrylate and its formation constitutes a great disadvantage of these known processes so that the advantages offered by the use of hydracrylic acid or of methoxy propionic acid as starting material instead of the methoxy propionic ester are offset. Furthermore, the presence of free acrylic acid in the distillate restricts the materials that can be used for the construction of the distillation columns. Also during the purification of the ester, for example, by extractive distillation with water, most of the acid, if not all of it, is lost.

It is an object of the present invention to provide a process for the manufacture of methyl acrylate from methoxypropionic acid. It is another object to provide a process which may be effected with particular advantage in a continuous manner. It is a further object to obtain the methyl acrylate in a high yield and practically free from free acrylic acid and also to avoid the other disadvantages mentioned above.

The present invention is based on the discovery that methyl-beta methoxypropionate is a very effective entrainer for water with which it forms a mixture with a constant boiling point of 95° C. containing water and methyl-beta-methoxypropionate in almost equal amounts.

According to this invention, the process for the manufacture of methyl acrylate comprises feeding beta-methoxypropionic acid into a heated medium comprising an acidic catalyst, a substantial proportion of methyl-beta-methoxypropionate and methanol, withdrawing by distillation from the heated medium methylacrylate substantially at the rate at which it is formed, together with methanol, water and methyl methoxypropionate using methyl acrylate and methoxypropionate as entrainers for the water and separating the methyl acrylate from the distillate. A particularly advantageous feature of the invention comprises carrying out the process in a continuous manner by providing for a sufficient amount of methanol and beta-methoxypropionic acid in the heated reaction medium so that the content in said medium of methanol and methyl-methoxypropionate is maintained substantially constant.

As acidic catalyst for the splitting off of the methoxy group in the form of alcohol strong mineral acids such as sulphuric acid and phosphoric acid, their acid esters and sulphonic acids, such as toluene sulphonic acid, may be used. Particularly suitable catalysts are sulphuric acid and its acid esters. A comparatively small amount of the catalyst in the heated medium is sufficient to effect the de-alcoholisation and esterification. The amounts to be used vary within wide limits and quantities of 15% and less of the total quantity of the said medium were found to give good results.

By using only small amounts of acidic catalyst charring is avoided or minimized whilst large amounts of strong acid tend to retain water which requires higher temperatures for its removal which in turn causes charring with loss of valuable material.

Furthermore, because of its comparatively low concentration the acidic catalyst acts in a catalytic manner only and does not serve as a means for dehydrating the mixture whereby the ester equilibrium is shifted. The small amount has, however, the drawback that the de-alcoholization activity might be considerably reduced or even brought to a standstill through dilution if the water content in the medium is allowed to build up. Although a part of the water formed by the esterification is taken out of the medium by distillation and entrainment by the methyl acrylate formed, the complete removal of the water is achieved according to this invention by the entrainment of the remainder by the methyl-beta-methoxypropionate. This complete removal of water from the medium makes it possible to effect the de-alcoholisation and esterification in a continuous manner.

The medium containing methyl-beta-methoxypropionate into which the beta-methoxypropionic acid is to be fed continuously in order to be de-alcoholised and at the same time esterified contains according to the process of this invention a substantial, preferably major, proportion of the said methyl-methoxypropionate, so that the partial vapour pressure of methyl-methoxypropionate in the medium is sufficiently high to ensure by entrainment with said vapours the complete removal of the water which is not taken out by the methyl acrylate produced in the medium. Conveniently, the methyl-methoxypropionate in the medium amounts to 20% or more thereof and is preferably in excess of 40% by weight.

The temperature in the reaction medium is kept at such a level that sufficient de-alcoholization takes place. Generally speaking this is above 120° C. but temperatures much above the boiling point of methyl-methoxypropionate, i. e. 142° C. should preferably not be exceeded; the preferred temperature is, therefore, between 120° and 140° C.

The presence of methanol in the reaction medium when effecting the process in a continuous manner may be achieved by continuously feeding methanol into the reaction medium either separately or together with the methoxypropionic acid or by providing sufficient methyl-beta-methoxypropionate which by de-alcoholization under the influence of heat and catalyst liberates methanol. The amount of methanol to be fed into the reaction medium depends partly on the amount which leaves the reaction mixture with the distillate and has to be replaced, but also on the amount of methyl-methoxypropionate ester which is removed from the system by entrainment with water according to the process of this invention. This last quantity may be reduced by fractionating the entrained vapour mixture so as to return to the medium as large an amount of methyl-methoxypropionate as possible in the medium, or by separating the methyl-methoxy ester from the distillate, removing therefrom the appropriate amount of water and recycling it to the reactor. When methanol is added to the medium it is advantageous to use a small amount only. Usually it is sufficient to add one mol. of methanol or even less to one mol. of methoxypropionic acid fed into the medium. More than one mol. may be used, but it is preferred not to exceed 2 mol. of methanol per mol. of methoxypropionic acid because this leads to the formation of unnecessary large amounts of methyl-methoxypropionate.

The amount of water which has to be removed from the reaction medium as a constant boiling mixture with the methylacrylate produced and methyl-methoxypropionate respectively, may readily be calculated from the amount of acid converted into esters within the system and it is possible to adjust the amount of methyl-methoxypropionate which is required for removing this amount of water once the distillation has started by fractionating the distillate and regulating the temperature in the fractionating system so that only that amount of propionate required to remove the water not entrained by the methacrylate is taken off whilst any excess of the propionate is returned to the reaction medium.

It has further been found that the use of a comparatively small amount of acidic catalyst offers the additional advantage that the formation of dimethyl ether by dehydration of part of the methanol which has been observed in the hitherto known processes where large quantities of acid have been employed is completely avoided or reduced to a negligible amount. This is of importance because the formation of dimethyl ether constitutes not only an unrecoverable loss of methanol but also necessitates a special purification of the final product in which the ether is found as an impurity.

The process according to the invention may be carried out in a simple reaction kettle. By maintaining in the reaction medium a high concentration of methyl-methoxypropionate the issuing vapours comprise all the water formed together with a certain proportion of methyl-methoxypropionate in addition to the methyl acrylate and methanol. These vapours may then be fed into a rectification column where they are separated into a distillate containing the methyl acrylate, some methanol and water and a higher boiling fraction containing aqueous methyl-methoxy-propionate, as shown in Figure 1 in the accompanying diagrammatic drawings which represent processes in a continuous manner.

Alternatively, the reactor may be the kettle of a rectification column wherein the vapours issuing from the kettle may be fractionated to a certain extent so that although the kettle liquid contains as high a concentration of methylmethoxypropionate as in the previously described modification there is at the top of the rectification column sufficient methyl-methoxypropionate to ensure during the reaction complete and continuous removal of all the water formed. By working in this way the amount of methyl-methoxypropionate leaving the system can be kept to the minimum required for the removal of the water, as shown in Fig. 2.

In order to separate the water from its entraining medium methyl-methoxypropionate in the vapours resulting from the reaction and containing methanol, methyl acrylate, water and methyl-methoxypropionate, an additional entrainer may be used. As such additional entrainer methyl acrylate itself may be used and may be recycled for this purpose to a suitable part of the rectification column and in a quantity sufficient to take overhead all the water liberated in the liquid reaction mixture.

As a simplified modification of the process the methoxy-propionic acid and methanol are fed into the kettle of a fractionating column which is charged with the methyl-methoxypropionate and the acidic catalyst. Into the lower part of this column sufficient methyl acrylate either in the form of liquid or vapour is introduced so as to give at the top of the column a mixture of methanol, methyl acrylate and all the water produced during the reaction. The methyl-methoxypropionate which initially served, in addition to the methyl acrylate, as entrainer for the water from the reaction medium, is returned by the fractionating column as reflux to the reaction medium in the kettle. It is surprising that under these conditions even the recirculation of methyl acrylate which thus serves as additional entrainer for the water from the vapour mixture does not lead to considerable losses by polymerisation due apparently to the absence of unsaturated acid in the vapours reaching this entraining stage.

Instead of methyl acrylate, it is possible, of course, to use in the same apparatus any other low boiling entrainer for water which can easily be partly or completely separated from methyl acrylate during the purification stage, such as benzene.

Instead of feeding the vapours issuing from the reactor into the bottom of a column from which the excess of methyl-methoxypropionate is refluxed into the kettle the vapours may with advantage be introduced into the middle of a fractionating column in which with the aid of a suitable entrainer such as methyl acrylate added for this purpose all the water is removed overhead together with the methanol and methyl acrylate produced in the reaction whilst water free methyl-methoxypropionate is withdrawn from the bottom of the fractionating column and if desired recycled to the reaction medium. If this column is run without an entrainer aqueous methyl-methoxypropionate is withdrawn at the bottom of said column and may be dehydrated in a further separate column by means of a different entrainer. The dry methoxypropionate may be recycled to the reaction medium, as shown in Fig. 3.

The methyl acrylate which with methanol and water is distilled off and condensed may be introduced into a column wherein the vapours meet in countercurrent a stream of water which washes out the methanol whereas the methyl acrylate distils off as an azeotrope which on condensation separates into two layers the top layer containing almost all the methyl acrylate and the bottom layer the water having dissolved therein a small quantity of methyl acrylate.

We have found that the mixture with a minimum boiling point of methyl-beta-methoxypropionate and water consists of 53.7% by weight of the ester and 46.3% by weight of water and separates into two phases on cooling, the top layer containing at 25° C. 15.3% w/w (by weight) of water and the bottom layer containing 46.5% w/w (by weight) of ester. Thus it is possible to use the methyl-methoxypropionate itself as an agent for separating the mixture of water and of methyl-beta-methoxypropionate, as it is obtained in working up the distillate resulting from the de-alcoholization and esterification process and containing methyl acrylate, methanol, methyl-methoxypropionate and water. The vapours distilling from the reaction medium are conducted into a heated column wherein they are washed by a countercurrent of water. Methyl acrylate-water azeotrope boiling at 71° C. distils off at the top of the column and a mixture of methanol, methyl-methoxypropionate and water is withdrawn at the bottom. This mixture is then conducted into a fractionating column from which methanol is taken at the top and a mixture of methyl-methoxypropionate and water is removed at the bottom, as shown in Fig. 4.

This last mixture is introduced into a conventional two-column system from the first column of which a methyl-methoxypropionate-water-azeotrope distils over. The condensate is taken to a separating device wherein two layers are formed. In some cases, however, the separation of the azeotrope into two layers does not take place very readily. This is due apparently to small amounts of methanol left in the higher boiling mixture which was withdrawn from the bottom of the fractionating column. In order to assist a speedy phase separation, it has been found expedient to add to the feed into the column a small amount of methyl acrylate. About 2% of the methyl acrylate calculated on the quantity of methyl-methoxypropionate fed were generally sufficient to produce the desired effect of quick separation into two layers. The top layer of methyl-methoxypropionate with a minor proportion of water is decanted and taken to a further fractionating column where it is separated into water-free ester which leaves at the bottom whilst the water-ester-azeotrope distils off and is returned to the separating device. The lower layer consisting of a major part of water with a minor amount of methyl-methoxy ester may be reintroduced into the first or preferably in the third column.

Instead of dehydrating the top layer containing about 85% ester and 15% water completely in the separate column, it is preferred to recycle the top layer directly to the reactor. Although this introduces water into the reaction medium, it has been found that this does not interfere with the efficiency of the process. On the other hand, this procedure dispenses with the use of a third fractionation column and the removal thereby of the admixed water.

Alternatively, the vapours from the reactor are separated by fractional distillation into a top distillate containing methanol, methyl acrylate and possibly some water, from which methyl acrylate may be isolated by way of an extractive distillation with water, and a residual product containing methyl-methoxypropionate and water as shown in Figure 5. This latter mixture separates into two layers, the top layer consisting of a large proportion of methyl-methoxypropionate with a comparatively small amount of water being either recycled directly to the reactor, or first dehydrated and then recycled to the reactor. From the bottom layer which is richer in water and poorer in methyl-methoxypropionate, the ester may be stripped off in the form of its azeotrope with water, which distillate can be passed to the same decanter which serves to separate the effluent from the bottom of the first fractionating column into the two layers. This procedure may be varied within the scope of our invention. Thus, for example, the first fractionation column, which serves to separate the low boilers from the aqueous methyl-methoxypropionate, is tapped at a point below the feed point where the methanol concentration is negligible, and this side stream is passed, after cooling, into the decanter. The lower layer in the decanter is returned to an appropriate part of the column, whilst the 85% ester layer (which forms the top layer in the decanter) is recycled to the reactor, either directly or alternatively after dehydration in a separate column, as described above. From the bottom of this column ester-free water is removed.

By the process of this invention it is possible to produce methyl acrylate in a continuous manner keeping the acid catalyst active for a very long time and eliminating practically completely the contamination of the produced methyl acrylate by free acrylic acid. Thus practically no polymerisation occurs in the kettle and practically no charring occurs in the reaction medium. The use of polymerisation inhibitors in the reaction medium in the kettle which in the hitherto known process had been considered indispensable is practically obviated.

The following examples illustrate the manner in which the invention may be carried out in practice.

Example 1

Into a reactor provided with a stirrer, and in which a mixture of 47.6% methyl-methoxypropionate, 40.2% methoxy-propionic acid, 10% sulphuric acid and small quantities of methyl acrylate, acrylic acid, methanol and water are kept boiling at 130° C., at atmospheric pressure, 104 parts methoxy-propionic acid and 32 parts methanol are introduced per hour. The vapours issuing from this reactor pass through a small reflux column, the top of which is kept at 74° C. and enter a fractionating column, from the top of which a mixture of 77.4 parts methyl acrylate and 28.3 parts methanol and from the bottom of which a mixture of 11.8 parts methyl-methoxypropionate and 18 parts of water are withdrawn per hour. From the distillate, the methyl acrylate is isolated for instance by extractive distillation of the mixture with water. The mixture withdrawn from the bottom is conducted into another column in which benzene is introduced as entrainer. From the bottom of this column the dry methyl-methoxy ester is withdrawn and recycled. This is shown in Figure 6 of the accompanying flow sheets.

This continuous process can be carried out for a long period without noticeable deterioration of the reaction, the output being 218 grams of methyl acrylate per litre of reaction volume per hour. The yield of methyl acrylate in the reactor is practically quantitative.

Example 2

Into a reactor containing the same boiling reaction mixture as in Example 1 at the same temperature, a feed of 93.6 parts methoxypropionic acid, 28.8 parts methanol and 11.8 parts methyl-methoxypropionate is introduced per hour. The distillate from the reactor consists of 77.4 parts methyl acrylate, 28.8 parts methanol, 11.8 parts methyl-methoxypropionate and 16.2 parts water and is separated as in Example 1. The output from the reactor is 272 grams methyl acrylate per litre reaction volume per hour, and the yield is again practically quantitative.

Example 3

Into a reactor containing a similar reaction mixture to that in the preceding examples, and at the same temperature, are fed per hour 51.7 parts methoxypropionic acid, 15.9 parts methanol and 7.66 parts water saturated methyl-methoxypropionate (85% w/w). The distillate from the reactor contains 12.6 parts methyl-methoxypropionate and 36.7 parts methyl acrylate together with water and methanol; the output from the reactor is 184 grams methyl acrylate per hour per litre reaction volume, the yield again being practically quantitative.

This distillate is fed into a fractionating column down which water at a rate of 380 parts per hour is fed; the distillate separates into two layers, the oil layer consisting of water-saturated methyl acrylate being removed by means of a decanter head; the still bottoms are fed to another still from which methanol is removed as heads and methyl-methoxypropionate and water as bottoms which are fed to another still in which 85% water saturated methyl-methoxypropionate is separated as heads by means of a decanter head for recycling to the process. A small addition of methyl acrylate is also fed to this still to assist phase separation in the decanter head since the phase separation is upset by small traces of methanol in this column, as shown in Fig. 4 of the accompanying flow sheets.

Example 4

Into a reactor containing p-toluene sulphonic acid was fed continuously a solution of 76.5% w/w methoxy propionic acid in methanol. The kettle was maintained at 140° C. and a distillate was removed through a small reflux column at such a rate as to maintain a substantially constant reaction volume. Under steady conditions the kettle contained approximately 15% w/w p-toluene sulphonic acid and 67% w/w methyl methoxy propionate. The distillate contained 45.4% methyl acrylate and 12% methyl methoxy propionate together with methanol and water.

The efficiency of the conversion of methoxy-propionic acid fed into the reactor to methyl-acrylate amounted to 89%.

Similar results were obtained when the acidic catalyst exemplified in the above examples was replaced by equivalent amounts of phosphoric acid or alkyl sulphuric acid esters.

Example 5

Into a reactor containing concentrated sulphuric acid is fed continuously a mixture containing 46.9% by weight methoxy-propionic acid and 53.1% by weight methylmethoxy propionate. The medium in the reactor is maintained at 135° C. and a distillate is removed through a small reflux column at such a rate and replaced by the above mixture of methoxy-propionic acid and methyl-methoxy-propionate as to maintain a substantially constant reaction volume. Under steady conditions the reactor contains approximately 15% by weight sulphuric acid and 73% by weight methyl-methoxy propionate. The distillate contains 67.0% methyl acrylate and 6.1% methyl-methoxy propionate together with methanol and water. The efficiency of conversion of methoxy-propionic acid and ester to methyl acrylate is 91.6%.

The distillate is worked up for the recovery of the various components as described in the previous Example 1 or 3.

In the above examples reference to methoxy-propionic acid is intended to designate beta-methoxy-propionic acid.

We claim:

1. Process for the manufacture of methyl acrylate which comprises feeding beta-methoxypropionic acid into a heated reaction medium comprising an acidic catalyst and a substantial proportion of methyl-beta-methoxypropionate and methanol; withdrawing by distillation from the heated medium methyl acrylate substantially at the rate at which it is formed, together with methanol, water and methyl-methoxypropionate by using methyl acrylate and methyl methoxypropionate as entrainers for the water and separating the methyl acrylate from the distillate.

2. Process according to claim 1, wherein the acidic catalyst is selected from the group consisting of strong mineral acids, their acid esters and toluene sulphonic acid.

3. Process according to claim 1, wherein the acidic catalyst is present in an amount not exceeding 15% by weight of the total medium.

4. Process according to claim 1, wherein the amount of methyl-beta-methoxypropionate in the reaction medium is more than 20% by weight.

5. Process according to claim 1, wherein the amount of methyl-beta-methoxypropionate in the reaction medium is more than 40% by weight.

6. Process according to claim 1, wherein the temperature of the reaction medium is between 120° and 140° C.

7. Continuous process for the manufacture of methyl acrylate which comprises feeding beta-methoxypropionic acid into a heated reaction medium comprising an acidic catalyst and a substantial proportion of methyl-beta-methoxypropionate and methanol, maintaining the concentration of the methyl-beta-methoxypropionate and methanol in the heated medium substantially constant by the addition thereto of a methanol supplying compound selected from the group consisting of methanol and methylmethoxypropionate, withdrawing from the said medium by distillate methyl acrylate substantially at the rate at which it is formed together with methanol, water and methyl-methoxypropionate by using methyl acrylate and methyl-methoxypropionate as entrainers for the water and separating the methyl acrylate from the distillate.

8. Continuous process according to claim 7 wherein the amount of methyl-beta-methoxypropionate is regulated in accordance with the amount of water to be removed from the reaction medium.

9. Process for the manufacture of methyl acrylate which comprises feeding beta-methoxypropionic acid into a heated reaction medium comprising an acidic catalyst and a substantial proportion of methyl-beta-methoxypropionate and methanol withdrawing by distillation from the heated medium methyl acrylate substantially at the rate at which it is formed together with methanol, water and methyl-methoxypropionate by using methyl acrylate and methyl-methoxypropionate as entrainer for the water and subjecting the vapours withdrawn by distillation from the said medium to fractionation whereby they are separated into a residual fraction comprising methyl-methoxypropionate and water and a distillate comprising methyl acrylate, methanol and water.

10. Process according to claim 9, wherein the distillate comprising methyl acrylate, methanol and water is subjected to a second fractionation whereby the vaporous mixture is subjected to extractive distillation with water to dissolve out the methanol and from where methyl acrylate with water distils over.

11. Continuous process for the manufacture of methyl acrylate which comprises feeding beta-methoxypropionic acid into a heated reaction medium comprising an acidic catalyst and a substantial proportion of methyl beta-methoxypropionate and methanol maintaining the concentration of the methyl beta-methoxypropionate and methanol in the heated medium substantially constant by the addition thereto of a methanol supplying compound selected from the group consisting of methanol and methyl-methoxypropionate, withdrawing from said medium by distillation methyl acrylate substantialy at the rate at which it is formed together with methanol, water and methyl-beta-methoxypropionate by using methyl acrylate and methyl-methoxypropionate as entrainers for the water, and subjecting the vapours withdrawn by distillation from said medium to fractionation whereby they are separated into a distillate comprising methyl-acrylate, methanol and water and a residual fraction comprising methyl-methoxypropionate and water.

12. Process according to claim 11 wherein the distillate comprising methyl acrylate, methanol and water is subjected to a second fractionation whereby the vaporous mixture is subjected to extractive distillation with water to dissolve out the methanol and methyl acrylate with water distils over.

13. Continuous process for the manufacture of methyl acrylate which comprises feeding beta-methoxypropionic acid into a heated reaction medium comprising an acidic catalyst and a substantial proportion of methyl-beta-methoxypropionate and methanol maintaining the concentration of the methyl-beta-methoxypropionate and methanol in the heated medium substantially constant by the addition thereto of a methanol supplying compound selected from the group consisting of methanol and methyl-methoxypropionate, withdrawing by distillation from the heated medium methyl acrylate substantially at the rate at which it is formed together with methanol, water and methyl-methoxypropionate by using methyl acrylate and methyl-methoxypropionate as entrainers for the water, and subjecting the vapours withdrawn by distillation from said medium to fractionation which is adjusted in such a manner that in the distillate coming over there is sufficient methyl methoxy propionate to ensure substantially complete removal of the water by entrainment therewith and to withhold as residue substantially all the methyl methoxy propionate substantially free from water.

14. Process according to claim 13 wherein the complete removal of the water is assisted by the introduction of an additional entrainer into the substances being fractionated.

15. Process according to claim 14, wherein the additional entrainer is methyl acrylate.

16. Process according to claim 1 wherein the vapours withdrawn by distillation from the heated reaction medium are subjected to fractionation, during which they are subjected to extractive distillation with water, then distilling off the methyl acrylate with water and obtaining a liquid residue containing methanol, methyl-methoxypropionate and water at the bottom.

17. Process according to claim 16 wherein the liquid residue fraction is separated by further fractionation into methanol and a mixture of methyl-methoxypropionate and water.

18. Process according to claim 16 wherein the mixture of methyl-methoxypropionate and water is fractionated to produce a distillate with a reduced content of water, which separates into a layer rich in methyl-methoxypropionate and poorer in water and a second layer which is richer in water and poorer in methyl-methoxypropionate.

19. Process according to claim 18 wherein the separation of the distillate into two layers is assisted by the introduction of methyl acrylate into the substances being fractionated.

20. Process according to claim 18 wherein the layer richer in methyl-methoxypropionate is returned to the heated reaction medium.

21. A process in accordance with claim 11 in which the acidic catalyst is phosphoric acid.

22. A process in accordance with claim 11 in which the acidic catalyst is sulphuric acid.

23. A process in accordance with claim 11 in which an alkyl acid ester of sulphuric acid is employed.

FREDERICK JAMES BELLRINGER.
THOMAS BEWLEY.
RONALD CHARLES SNELL.
KARL HEINRICH WALTER TURCK.

References Cited in the file of this patent

UNITED STATES PATENTS

| Number | Name | Date |
|---|---|---|
| 1,890,277 | Bauer | Dec. 6, 1932 |
| 2,303,842 | Kirk et al. | Dec. 1, 1942 |
| 2,341,663 | Schulz | Feb. 15, 1944 |